US006976036B2

(12) United States Patent
Lau et al.

(10) Patent No.: US 6,976,036 B2
(45) Date of Patent: Dec. 13, 2005

(54) DATABASE MANAGEMENT SYSTEM

(75) Inventors: Yun-Tung Lau, Bethesda, MD (US); Richard Chipman, Reston, VA (US); Peter Poon, Quincy, MA (US); Kiran Kuchipudi, Reston, VA (US)

(73) Assignee: Science Applications International Corporation, San Diego, CA (US)

( * ) Notice: Subject to any disclaimer, the term of this patent is extended or adjusted under 35 U.S.C. 154(b) by 148 days.

(21) Appl. No.: 09/957,570

(22) Filed: Nov. 6, 2001

(65) Prior Publication Data

US 2003/0088584 A1 May 8, 2003

(51) Int. Cl.[7] .............................................. G06F 17/30
(52) U.S. Cl. .............................. 707/200; 707/5; 707/8; 707/10; 707/104.1; 707/103 R
(58) Field of Search ..................... 707/1–5, 8, 10, 707/200, 100, 101, 102, 103 R, 104.1; 704/3, 10; 709/315, 219, 245; 717/137

(56) References Cited

U.S. PATENT DOCUMENTS

| | | | | |
|---|---|---|---|---|
| 5,493,677 A | * | 2/1996 | Balogh et al. | 707/104.1 |
| 5,495,603 A | * | 2/1996 | Fruchtman et al. | 707/200 |
| 5,586,326 A | * | 12/1996 | Ryu et al. | 717/104 |
| 5,809,507 A | * | 9/1998 | Cavanaugh, III | 707/103 R |
| 6,014,664 A | * | 1/2000 | Fagin et al. | 707/5 |
| 6,038,668 A | | 3/2000 | Chipman et al. | 713/201 |
| 6,067,548 A | * | 5/2000 | Cheng | 707/103 R |
| 6,067,584 A | * | 5/2000 | Hayles et al. | 710/10 |
| 6,078,926 A | * | 6/2000 | Jensen et al. | 707/103 R |
| 6,104,874 A | | 8/2000 | Branson et al. | 395/702 |
| 6,112,209 A | | 8/2000 | Gusack | 707/101 |
| 6,397,219 B2 | * | 5/2002 | Mills | 707/10 |
| 6,556,987 B1 | * | 4/2003 | Brown et al. | 707/3 |
| 6,629,092 B1 | * | 9/2003 | Berke | 707/3 |
| 2002/0128989 A1 | * | 9/2002 | Thess et al. | 706/16 |

OTHER PUBLICATIONS

"Soft–Classing to Create Evolving Ontologies for Distributed Resources," by K.J.Laskey and Q.Lin #62, no date.
Technology License Opportunity, "Smart Product Model Tool Suite" dated Sep. 17, 2002, #63.

* cited by examiner

Primary Examiner—Charles Rones
Assistant Examiner—Jacques Veillard
(74) Attorney, Agent, or Firm—Kilpatrick Stockton LLP (57) ABSTRACT

The present invention is related to a database management system that is capable of autonomous dynamic ontology management through soft classing. The present invention is further related to a method of database management by dividing attribute data, e.g., price=10 dollars, into class elements containing data, e.g., attribute name=price, type= numeric, default units=dollars, and entry elements containing data, e.g., attribute value=10, to permit dynamic ontology management and evolution in the database through soft classing.

8 Claims, 6 Drawing Sheets

Fig. 6

DATABASE MANAGEMENT SYSTEM

BACKGROUND OF THE INVENTION

1. Field of the Invention

The present invention relates to an electronic system for data management. In particular, it relates to a database management system that dynamically characterizes and classifies data, with or without administrative assistance, i.e., soft classing. The present invention further relates to a method for automatic, human unassisted, database creation and administration.

2. Description of Related Art

Since the advent of the first computer systems in the late 1940's, management of data has shifted more and more from manually kept books and charts to vast electronic databases. For example, department store inventories were once managed by a complex manual system of accounting books. In a men's shirt department, information such as shirt style, color, neck size, sleeve length, etc. had to be manually tracked to ensure sufficient quantities of shirts types and to account for sales of each shirt. Similarly, production lines were once manually managed and tracked. Complex manual paper systems were set up by manufacturers to track quantities of incoming raw materials, the amounts of such materials used in the manufacture of batches of items, and the shipment of the completed items.

Electronic data management systems have largely replaced the complex manual systems of yesterday. Typically, database administrators (DBAs) set up customized databases to track items for each store, manufacturer, or any other commercial setup that needs to categorize and track data. For example, in a store that specializes in men's clothes, a DBA may set up a database with separate categories for each type of class, e.g., shirts, pants, underclothes, etc. The DBA may further subcategorize, or classify, these database categories. The "shirts" class may contain attributes such as neck size, color, sleeve length, etc., depending on the characteristics, or attributes, of the shirts that would typically be inventoried and sold by the store.

Clothing in the men's store is then inventoried and tracked with bar codes or item numbers for each item. Each such bar code or item number is related to a set class and set of attributes in the database. When a sales or inventory clerk in the store enters the bar code or item number into a computer, the code or number is electronically related to the class and its set of attributes in the database. This way, the store can automatically track the pricing of items, the quantity of each item in inventory, the quantity of items with certain attributes that need to be ordered to maintain an appropriate inventory, etc. For example, by entering a bar code or item number into a computer or electronic cash register, a sales clerk can retrieve pricing and sales information on each item. The store manager or ordering clerk can search the database and automatically retrieve information on the quantity of certain items in the store's inventory, thereby determining which items to order. Likewise, a buying planner can search the database to determine popular items and items with slow sales to analyze future buying and inventory needs for the store.

Data management for production lines has been similarly automated. DBAs configure software to create specific databases of classes and attributes for manufacturers. However, in both the store inventory and production line example, a great number of different configurations of classes and attributes per class are possible. For example, a department store may carry vast numbers of different items and many different vendors may supply each item, each vendor creating a like item with different attributes. A "Do-It-Yourself" store carries thousand of items for fixing a home. One such item, a screw, comes in hundreds of combinations of attributes such as bore width, thread size, length, material, etc. This results in a complex inventory database that must be able to accommodate many different screw configurations, as well as many different configurations of countless other items.

Likewise, production lines, for example in automobile production, use thousands of parts to create one type of item. The same production line can also be used to make many varieties of one type of item having different attributes and, therefore, requiring different parts. This, again, results in a complex inventory database that must be able to accommodate many different possible manufacturing configurations.

Adding to this complexity is the fact that each different store and each different manufacturer maintain differing types of inventories and have differing needs for their data management. Thus, database management software is typically personalized for each user as a fixed data model and requires a DBA to set up specific databases. Moreover, as stores, manufacturers, etc. acquire new material vendors or the vendors change their databases and classification systems, DBAs have to adjust the database management systems of the stores, manufacturers, etc. to properly track and maintain the changing classes and attributes of data.

Fixed data models in large databases are also used in electronic commerce. Besides requiring a DBA to set up and maintain each database on the internet, internet businesses face other burdens from using rigid table or database structures. Few internetworked businesses share the same ontologies. For example, an online vendor selling camera supplies may list different attributes for the same camera part or even list the same attributes under different labels than other online vendors. These differing ontologies complicate e-commerce by making it difficult for potential consumers or intermediate resellers to search and compare multiple e-vendors from the same web site.

SUMMARY OF THE INVENTION

This invention relates to a novel database management system. This database management system allows for dynamic categorization of data. The system works as a type of electronic DBA. Instead of requiring a DBA to pre-define categories and attributes of a database (fixed data model) and to change categories and attributes as the data changes, this novel flexible system is capable of automatically creating a classification scheme as new data is presented to the database (soft classing). The present ontology management system (OMS) is capable of autonomously adding, deleting, or renaming attributes in an existing database or creating an entire new database with or without human intervention. Such dynamic ontology of the present invention is achieved by the electronic separation of common attribute information (such as price, size, etc.) from the actual attribute values (such as 10 dollars, 36L) as the data is entered into the database. This invention also relates to methods for such dynamic and autonomous management of ontology in a database.

Through this dynamic ontology, the present invention can be used to eliminate the need for personalized databases and human intervention in creating and maintaining databases. The soft classing method of the present invention also eases and improves searching of databases. Thus, the OMS described herein also improves e-commerce by facilitating business to business communication and vendor to vendor comparisons via the Internet.

DETAILED DESCRIPTION OF PREFERRED EMBODIMENTS OF THE INVENTION

The present invention relates to an ontology database management system that captures and regulates the relationship between classes and their attributes in a database through human intervention, autonomously upon the entry of new attributes, autonomously through analysis of usage, or a combination thereof. The following notations and terminology are used to describe the present invention (they are standard notations from the Unified Modeling Language):

In most conventional database management systems, all information about a class, e.g., shirt, is stored as attributes (e.g., "price=10 dollars", "color=red"). This design is incapable of autonomously controlling ontology. Because the object contains both the attribute name (e.g., price) and the attribute value (e.g., 10 dollars), the database management system cannot create a new database field on its own. A human must intervene and create a new database field, e.g., "price," so that the value, e.g., 10 dollars, can be entered under it.

Figure 1:
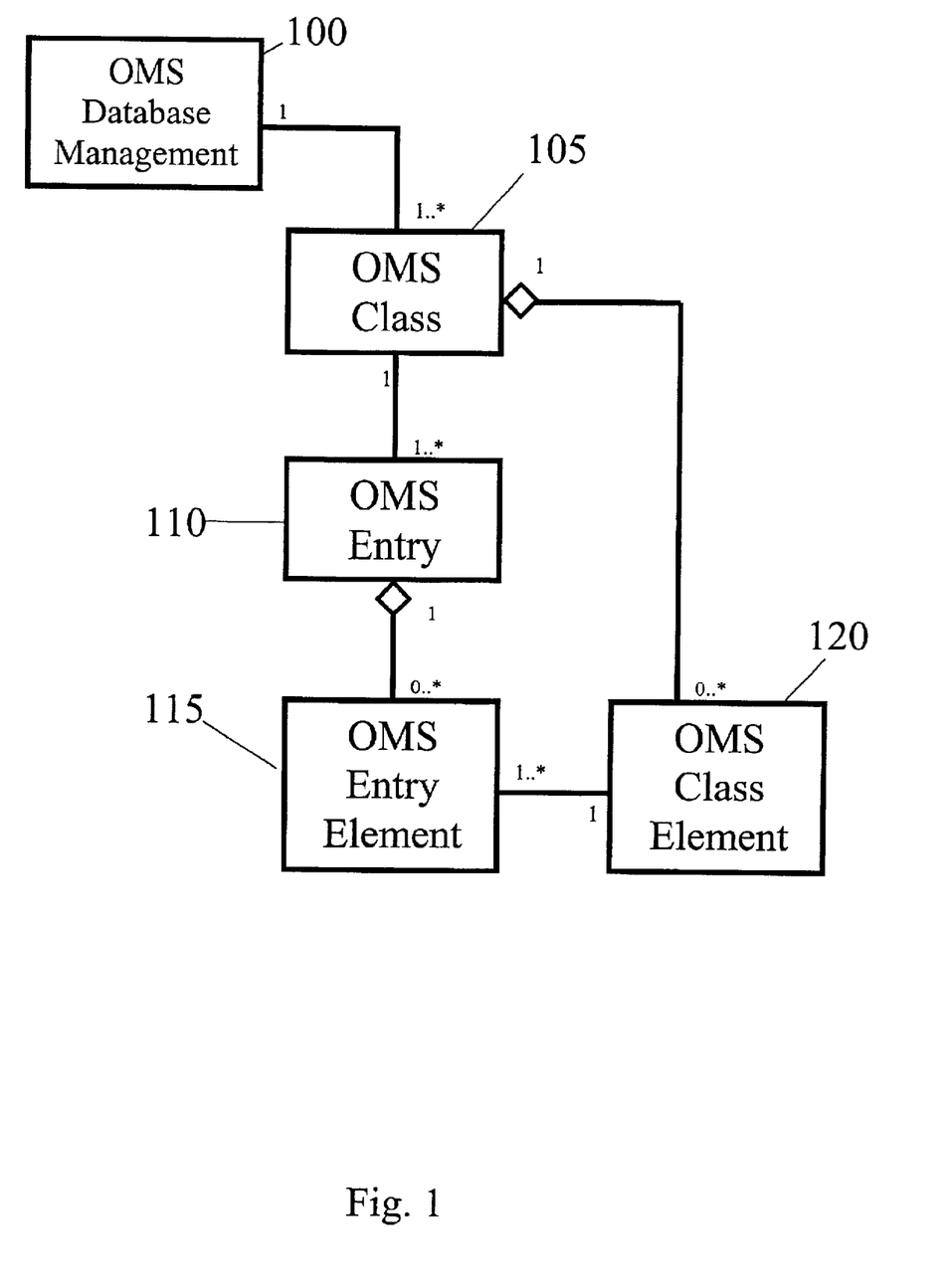
FIG. 1 is an example of an object oriented design for an OMS with soft classing.
Figure 2:
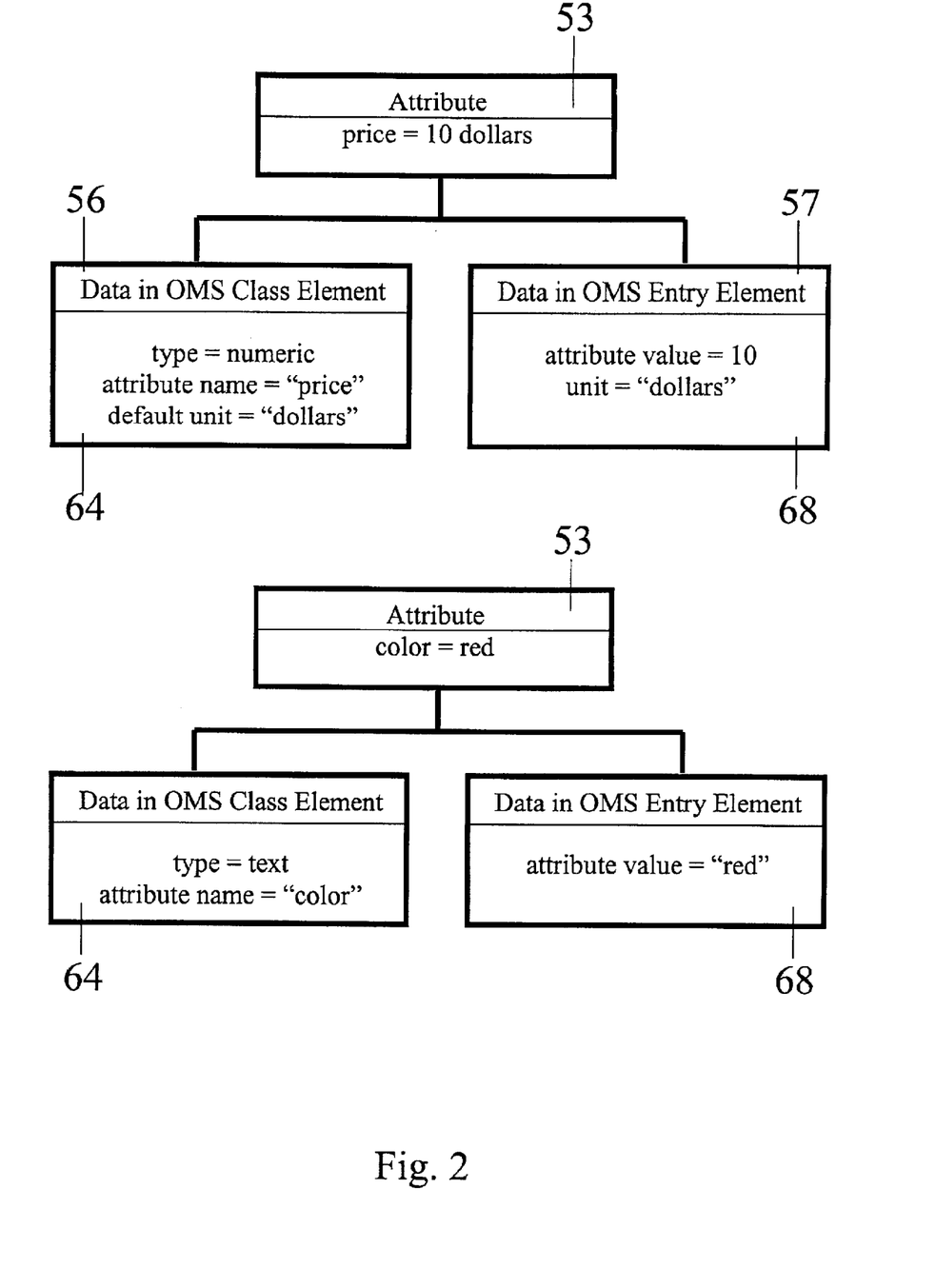
FIG. 2 is a table showing different types of attributes captured by an OMS of the present invention.

According to a preferred embodiment of the present invention, as depicted in FIG. 1, the OMS database management system 100 manages multiple OMS classes 105. Each OMS class 105 contains a collection of OMS class elements 120 (the attribute set). These class elements 120 store common attribute information for the class 105, e.g., name, attribute type, default units. The OMS entry element 115 stores the actual value of an attribute, e.g., dollar amount for price, the string "red" for color. Each class element 120 may be associated with one or more entry elements 115. The four overall groups, OMS class 105, OMS entry 110, OMS entry element 115, and OMS class element 120, constitute the core object structure for soft classing. This separation of common attribute information from the actual attribute values allows the OMS to dynamically adjust ontology in the database. FIG. 2 demonstrates examples of different types of information captured by the objects entry element and class element. In a preferred embodiment of the present invention, the OMS divides the attribute 53, e.g., "price=10 dollars, "color=red" into class elements 56 and entry elements 57, wherein the class element data comprises an attribute name 64 and the entry element data comprises an attribute value 68.

Figure 3:
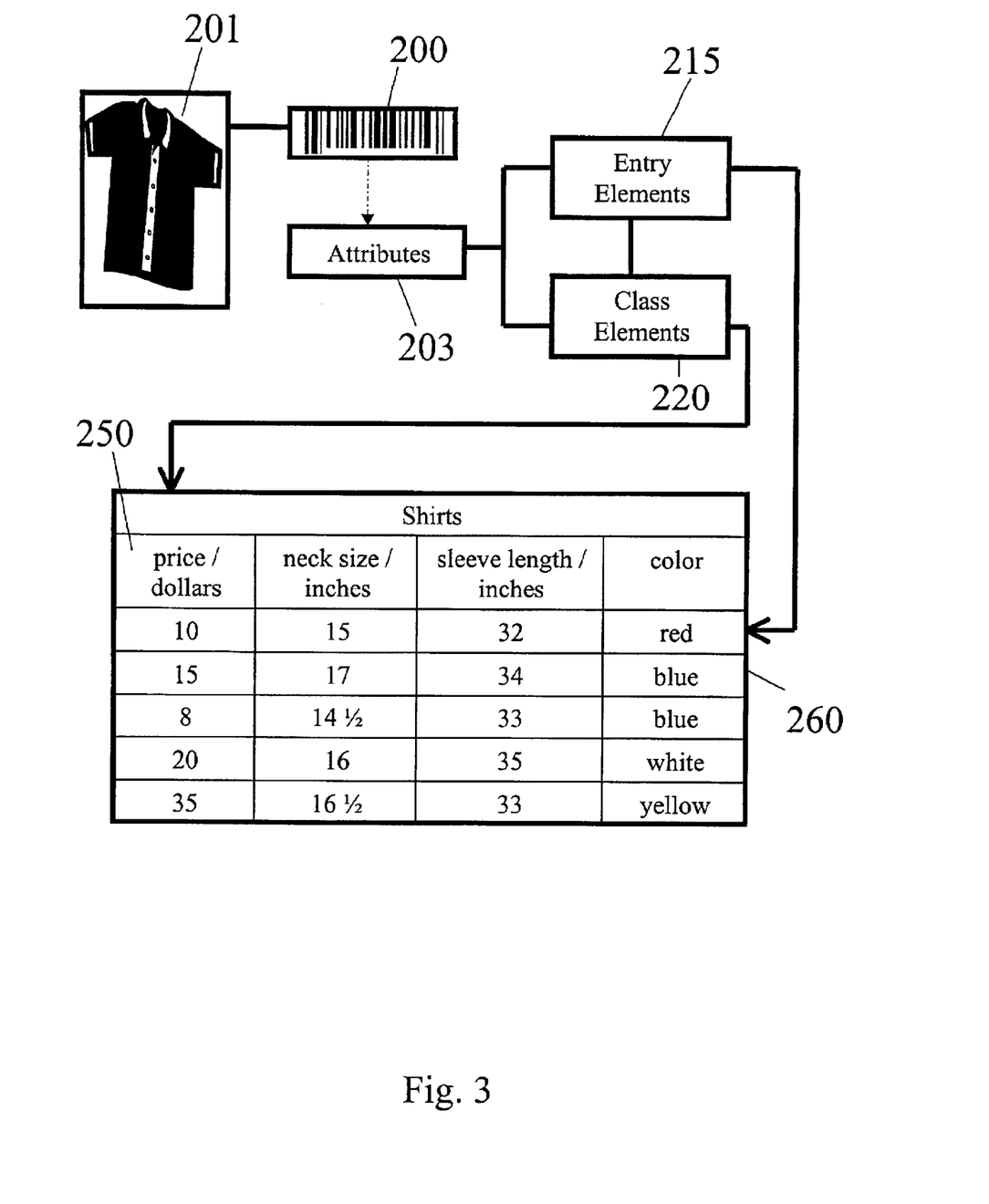
FIG. 3 is a flowchart depicting an example of how the OMS of the present invention creates a database.

In one preferred embodiment where the novel OMS is used to create a database, as data is entered into the OMS, e.g., by scanning a bar code or collecting web page content, the OMS uses the class elements to create new attribute fields in the database. As shown by way of example in FIG. 3, as the bar code 200 on a shirt 201 is scanned to add to a store's inventory, the OMS receives attribute data 203, e.g. price=10 dollars, neck=15 inches, sleeve length=32 inches, color=red. The OMS uses the first set of class elements 220 to create attribute heading fields 250 in the database. The OMS can be programmed to create the attribute headings automatically, to prompt a human to select whether the collected class element data should be entered as an attribute heading into the database, or to hold collected data in reserve until a certain number of the same class elements are collected (e.g., until 3 scanned bar codes produce the attribute name "price") and then either prompt for human intervention or automatically create the attribute heading. In this way, the set of OMS class elements belonging to a class in effect define the OMS class. The OMS enters the entry elements 215 as entry fields 260 within the related attribute headings. Then, as further shirt data is entered, the OMS continues to add the entry elements from each shirt as entry fields within the attribute headings.

In another preferred embodiment, the novel OMS is used to maintain and adjust a database. As shown by way of example in FIG. 4, the OMS 300 continues to add entry elements from each class, e.g., shirt, as entry fields 360 within the attribute headings 350. When shirt attributes from different vendors are entered, however, there may be new class elements. When the novel OMS 300 detects new class element 320 data, e.g., attribute name=fabric, it can automatically add the new class element 320 data as another attribute heading 350 to the database within the class 340 "shirt," automatically ignore or discard the new class element 320 data, prompt a human to select whether the new class element 320 data should be entered as another attribute heading 350, or hold collected data in reserve until a certain number of the same new class element 320 data, e.g., "fabric" attribute names, are collected and then either prompt for human intervention or automatically create the attribute heading 350. The OMS 300 enters the entry element 315 data, e.g. attribute values, that relate to the new class element 320 as entry fields 360 within the attribute headings 350.

Figure 4:
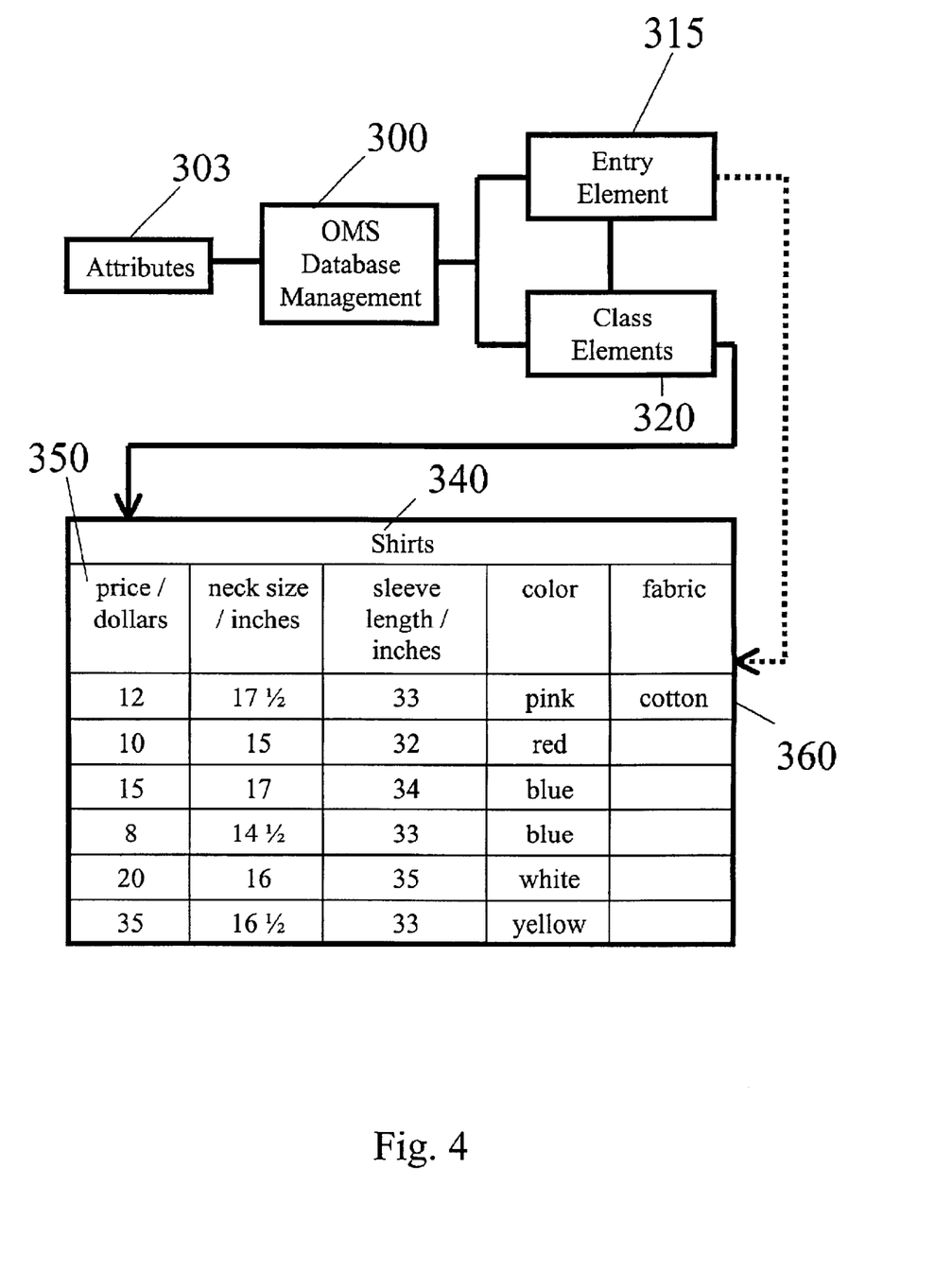
FIG. 4 is a flowchart depicting an example of how the OMS of the present invention maintains and updates a database through soft classing.

In this way, the present invention enables the autonomous evolution of class definitions over time. Not only does the OMS recognize categories and store entered data in their appropriate defined classes, but it can also recognize class alterations implied by single (or multiple) instances in the class and take action to modify the class.

Figure 5:
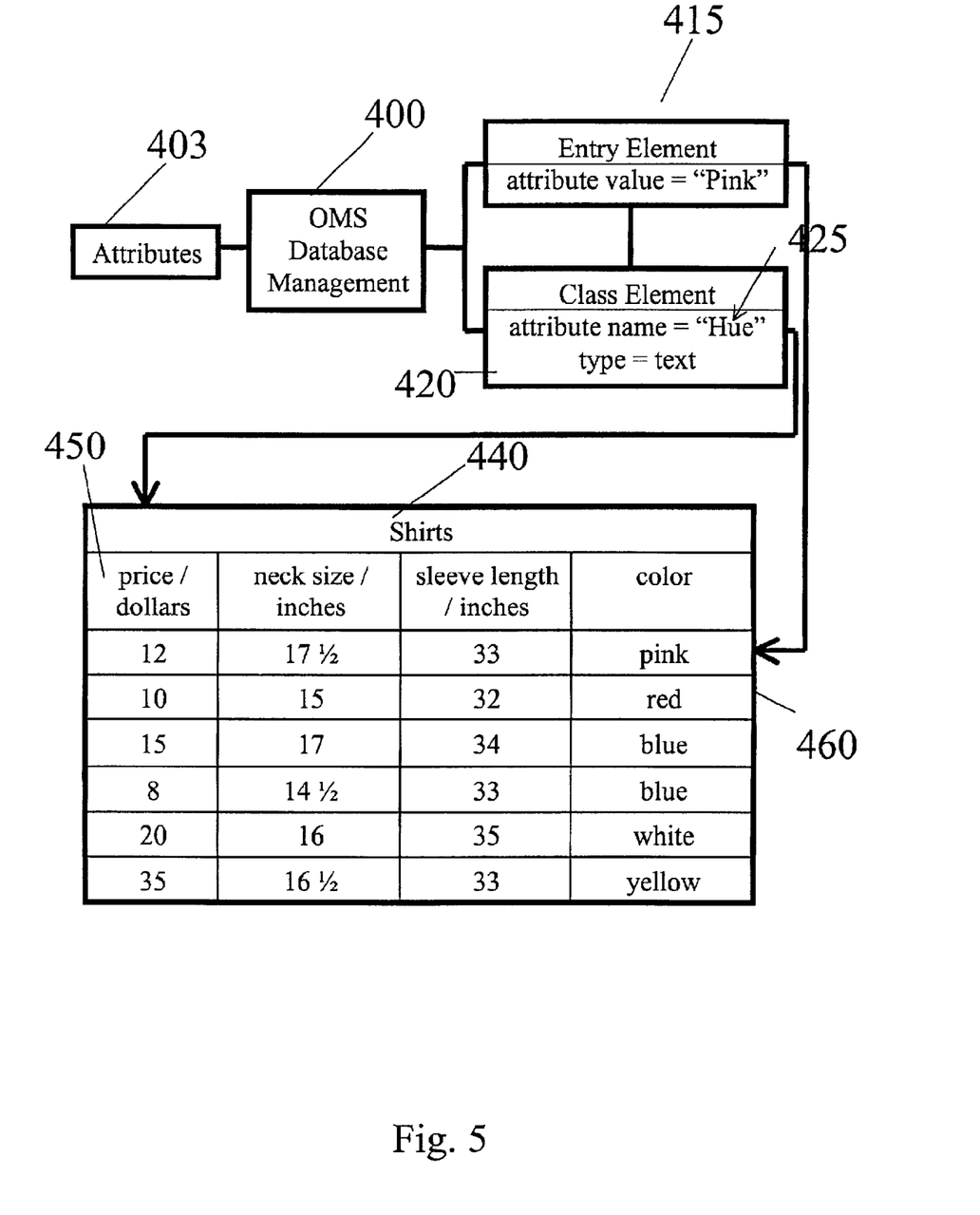
FIG. 5 is a flowchart depicting another example of how the OMS of the present invention maintains and updates a database through soft classing.

In yet another preferred embodiment, the novel OMS is again used to maintain and adjust a database. As shown by way of example in FIG. 5, the OMS 400 continues to add entry elements from each class 440, e.g., shirts, as entry fields 460 within the attribute headings 450. When shirt attributes 403 from different vendors are entered, however, the same attribute may be labeled differently. For example, previous vendor A may use the attribute name "color," while vendor B uses "hue." When the novel OMS 400 detects a class element 420 containing a new attribute name 425, it can compare the remaining data in the class element 420 or in the entry element 415 to existing data already entered in the database. The present invention can then determine whether the new attribute name 425 is equivalent to an existing attribute heading 450. If so, the OMS 400 can automatically enter the entry element data into the existing attribute heading 450, e.g., color, or the OMS 400 can automatically adjust the attribute heading 450 for the existing data and enter further entry elements 415 under the new attribute heading, e.g. hue, or the OMS 400 can hold the new class element 420 in reserve until a certain number of the same class elements, e.g., with the attribute name=hue, are entered and then change the attribute heading "color" to "hue." Also, the OMS 400 can be set up to prompt for human intervention at the stage where the OMS determines whether the new attribute name is equivalent to an existing attribute heading and/or at the stage where the OMS determines whether to add the entry element data related to the new class element into an existing attribute heading or discard the existing attribute heading in preference of the new attribute name.

Similarly, when multiple classes, e.g., shirts, pants, and socks, or the same class which is labeled differently by different vendors, e.g. "pants" by vendor A and "trousers" by vendor B, are entered into the OMS, the OMS can determine the appropriate class to enter the data by comparing the incoming class elements and entry elements with attribute headings and entry fields already in the database. Thus, the novel OMS of the present invention is capable of determining both the appropriate class and attribute heading in which to place incoming data by comparing the incoming data to existing attribute headings and entry fields.

As can be understood from the description above, the present invention is capable of functioning autonomously as an electronic DBA. Furthermore, the databases created, maintained, and adjusted by the OMS of the present invention are fully and more easily searchable by a user. Using the same system as described in FIG. 6 for determining the appropriate class or attribute heading into which to place incoming data, the OMS can search a database using attribute comparison. For example, in a database with a class name of "pants," a user can still run a successful search by querying for "trousers." If a user requests the OMS to search for the number of "trousers" with a "36 inch waist width" that are priced at "30 dollars" in inventory, the OMS can compare the waist width attribute name with attribute headings in the classes to successfully respond to the user's inquiry.

By creating, maintaining, and adjusting databases, and easing database searching, the novel OMS of the present invention also facilitates e-commerce. For example, a website that sells cameras may pull data for camera equipment from multiple different internet vendors. Each vendor may list different camera attributes for the same camera or may differently define camera attributes such as price, battery, lenses, and manufacturing information. The OMS of the present invention allows a user to search all of the vendors from one camera selling website.

Figure 6:
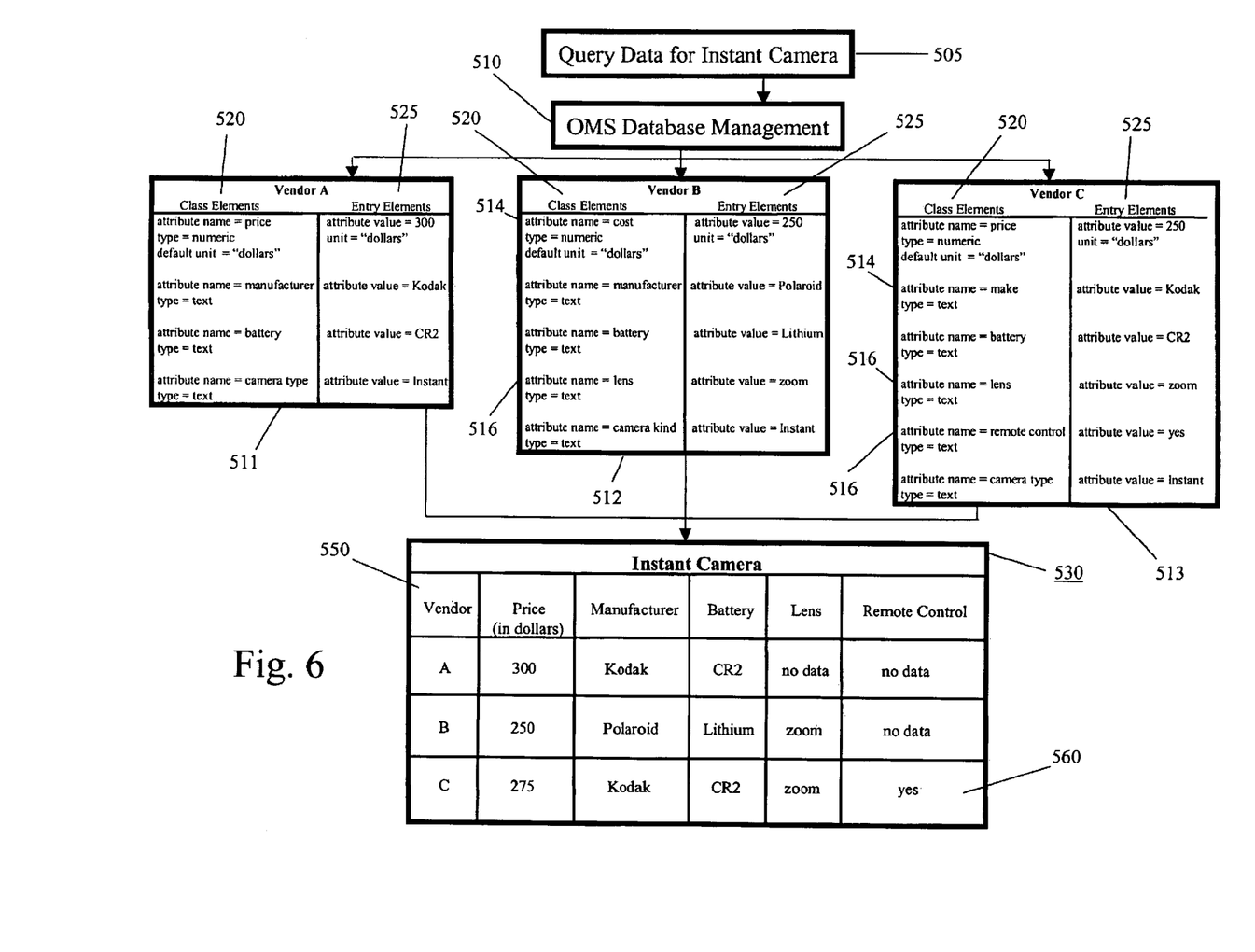
FIG. 6 is a flowchart depicting an example of how the OMS of the present invention dynamically creates a database in response to a user's internet search query.

Looking to FIG. 6 by way of example, when a user runs a query 505 on the types of camera equipment available, e.g., to compare available instant cameras from different vendors 511, 512, 513, the OMS 510 can scan all of the vendor's websites and/or databases to automatically create a database 530 based on the query 505. Even though different vendors may list the same attributes of a camera using different attribute names 514 or may list different attributes for the same camera, the OMS 510 can dynamically manage the different ontologies to create a uniform database. As shown in FIG. 6, Vendor A 511 may list attributes such as price, manufacturer and battery for its available instant camera, Vendor B 512 may list the "price" attribute name as "cost" and may list manufacturer, battery, and lens attributes, and Vendor C 513 may list the "manufacturer" attribute name as "make" and may list price, battery, lens, and remote control availability attributes. The OMS compares class elements 520 and entry elements 525 of the attributes of the multiple vendors. As described above, the OMS 510 can determine, based on such a comparison, which class elements, though having different attribute names, are really the same. As shown in FIG. 6, the OMS 510 can then select the most commonly used attribute name as the default attribute heading 550 for the database 530 created in response to the query 505. The OMS can also prompt for human intervention to determine whether the attribute names should be grouped as the same attribute heading and can also prompt for human intervention to select the appropriate attribute heading, or can simply delete the differently labeled attribute name.

The OMS can, likewise, automatically add attribute headings 550 and their related entry fields 560 from additional attributes that are listed by some vendors but not by others. The OMS can also simply delete the additional attribute names 516 or prompt for human intervention in determining whether to add or delete the additional attribute names 516.

Other embodiments and uses of the invention will be apparent to those skilled in the art from consideration of the specification and practice of the invention disclosed herein. The specification and examples should be considered exemplary only with the true scope and spirit of the invention indicated by the following claims. As will be understood by those of ordinary skill in the art, variations and modifications of each of the disclosed embodiments can be made within the scope of this invention as defined by the following claims.

What is claimed is:

1. A method for autonomous electronic creation of a database by an ontology database management: system comprising:

dividing incoming attribute data into a class element comprising data and an entry element comprising data, wherein the class element data comprises an attribute name, the entry element data comprises an attribute value and the attribute value is related to the attribute name;

creating at least one attribute heading with the class element data;

adding the entry element data as at least one entry field under the attribute heading;

after creating at least one attribute heading, dividing subsequent incoming attribute data into a subsequent class element containing data and a subsequent entry element containing data, wherein the subsequent class element data comprises the subsequent attribute name, the subsequent entry element data comprises the subsequent attribute value and the subsequent attribute value is related to the subsequent attribute name;

comparing the subsequent attribute name to the at least one attribute heading already existing in the database;

if the subsequent attribute name is identical to any of the at least one attribute heading already existing, adding the subsequent entry element data under the identical attribute heading;

if the subsequent attribute name is not identical to any of the at least one attribute heading already existing; in, the database, comparing the subsequent class element data and the subsequent entry element data to existing data in the database to determine whether the subsequent attribute name is the equivalent of the at least one attribute; heading already existing in the database;

if the subsequent attribute name is the equivalent of the one of the at least one attribute heading, entering the subsequent entry element data under the equivalent attribute heading; and if the subsequent attribute name is not equivalent to one of the at least one attribute heading, creating a new attribute heading with the subsequent attribute name, discarding the subsequent incoming data, holding collected subsequent incoming data in reserve until a certain number of identical attribute names are obtained then creating a new attribute heading with the subsequent attribute name, prompting for human intervention to determine whether to create a new attribute heading with the subsequent attribute name, or holding collected data in reserve until a certain number of identical attribute names are obtained then prompting for human intervention to determine whether to create a new attribute heading with the subsequent attribute name.

2. The method of claim 1, further including the step of obtaining incoming attribute data by scanning a bar code, traversing web page content, or a combination thereof.

3. The method of claim 1 wherein the ontology database management: system prompts for human intervention before creating the at least one attribute heading.

4. The method of claim 1 further comprising the step of searching the created database by querying the ontology database management system using attribute names, attribute values, or a combination thereof in the query.

5. A method for dynamically managing the ontology of a database, the method comprising:

dividing incoming attribute data into a class element containing data and an entry element comprising data, wherein the class element data comprises an attribute name, the entry element data comprises: an attribute value and the attribute value is related to the attribute name;

comparing the attribute name to an at least one attribute heading already existing in the database;

if the attribute name is not identical to any of the at least one attribute heading already existing in the database, comparing the class element data and the entry element data to existing data in the database to determine whether the attribute name is the equivalent of at least one attribute heading already existing in the database;

if the attribute name is the equivalent of one of the at least one attribute heading already existing in the database, entering the entry element data into the database under the equivalent attribute heading; and if the attribute name is not equivalent to one of the at least one attribute heading, creating a new attribute heading with the attribute name, discarding the incoming attribute data, holding collected incoming attribute data in reserve until a certain number of identical attribute names are obtained then creating a new attribute heading with the attribute name, prompting for human intervention to determine whether to create a new attribute heading with the attribute name, or holding collected data in the reserve until a certain number of identical attribute names are obtained then prompting for human intervention to determine whether to create a new attribute heading with the attribute name.

6. The method of claim 5 further comprising:

if the attribute name is the equivalent of one of the at least one attribute heading, replacing the one of the at least one attribute heading with the attribute name, discarding the attribute name, holding the class element data in reserve until a certain number of same attribute names are obtained then replacing the one of the at least one attribute heading with the attribute name, prompting for human intervention to determine whether to replace the one of the at least one attribute heading with the attribute name, or holding the class element data in reserve until a certain number of same attribute names are obtained then prompting for human intervention to determine whether to replace the one of the at least one attribute heading with the attribute name.

7. A method for autonomous electronic creation of a database by an ontology database management system comprising:

dividing incoming attribute data into a class element comprising data and an entry element comprising data, wherein the class element data comprises an attribute name, the entry element data comprises an attribute value and the attribute value is related to the attribute name;

creating at least one attribute heading with the class element data;

adding the entry element data as at least one entry field under the attribute heading;

after creating at least one attribute heading, dividing subsequent incoming attribute data into a subsequent class element containing data and a subsequent entry element containing data, wherein the subsequent class element data comprises the subsequent attribute name, the subsequent entry element data comprises the subsequent attribute value and the subsequent attribute value: is related to the subsequent attribute name;

comparing the subsequent attribute name to the at least one-attribute heading already existing in the database;

if the subsequent attribute name is identical to any of the at least one attribute heading already existing adding the subsequent entry element data under the identical attribute heading;

if the subsequent attribute name is not identical to any of the at least one attribute heading already existing in the database, comparing the subsequent class element data and the subsequent entry element data to existing data in the database to determine whether the subsequent attribute name is the equivalent of the at least one attribute; heading already existing in the database;

if the subsequent attribute name is the equivalent of one of the at least one attribute heading, entering the subsequent entry element data under the equivalent attribute heading; and if the subsequent attribute name is not equivalent to one of tile at least one attribute heading, creating a new attribute heading with the subsequent attribute name, adding the subsequent entry element data under the new attribute heading.

8. A method for autonomous electronic creation of a database by an ontology database management system comprising:

dividing incoming-attribute data into a class element comprising data and an entry element comprising data, wherein the class element data comprises an attribute name, the entry element data comprises an attribute value and the attribute value is related to the attribute name;

creating at least one attribute heading with the class element data;

adding the entry element data as at least one entry field under the attribute heading;

after creating at least one attribute heading, dividing subsequent incoming attribute data into a subsequent class element containing data and a subsequent entry element containing data, wherein the subsequent class element data comprises the subsequent attribute name, the subsequent entry element data comprises the subsequent attribute value and the subsequent attribute value is related to the subsequent attribute name;

comparing the subsequent attribute name to the at least one attribute heading already existing in the database;

if the subsequent attribute name is identical to any of the at least one attribute heading already existing, adding the subsequent entry element data under the identical attribute heading;

if the subsequent attribute name is not identical to any of the at least one attribute heading already existing; in the database, comparing the subsequent class element data and the subsequent entry element data to existing data in the database to determine whether the subsequent attribute name is the equivalent of the at least one attribute heading already existing in the database;

if the subsequent attribute name is the equivalent of one of the least one attribute heading, entering the subsequent entry element data under the equivalent attribute heading; and if the subsequent attribute name is not equivalent to one of the at least one attribute heading, creating a new attribute heading with the subsequent attribute name, holding collected subsequent incoming data in reserve until a certain number of identical attributes names are obtained then creating a new attribute heading with the subsequent attribute name, prompting for human intervention to determine whether to create a new attribute heading with the subsequent attribute name or holding collected data in reserve until a certain number of identical attribute names are obtained then prompting for human intervention to determine whether to create a new attribute heading with the subsequent attribute name.

\* \* \* \* \*

UNITED STATES PATENT AND TRADEMARK OFFICE
CERTIFICATE OF CORRECTION

PATENT NO. : 6,976,036 B2
APPLICATION NO. : 09/957570
DATED : December 13, 2005
INVENTOR(S) : Yun-Tung Lau, Richard Chipman, Peter Poon, and Kiran Kuchipudi It is certified that error appears in the above-identified patent and that said Letters Patent is hereby corrected as shown below:

IN THE CLAIMS-

In Column 6, Claim 1, Line 48, please change "database by an ontology database management: system" to -- database by an ontology database management system --

In Column 7, Line 8, please change "the at least one attribute heading already existing; in," to -- the at least one attribute heading already existing in --

In Column 7, Line 13, please change "attribute; heading already existing in the database;" to -- attribute heading already existing in the database;--

In Column 7, Line 14, please change "if the subsequent attribute name is the equivalent of the" to -- if the subsequent attribute name is the equivalent of --

In Column 7, Line 37, please change "management: system prompts for human intervention before" to -- management system prompts for human intervention before --

In Column 7, Line 46, please change "containing data and an entry element comprising data, " to -- containing data and an entry element containing data, --

In Column 7, Line 48, please change "name, the entry element data comprises: an attribute" to -- name, the entry element data comprises an attribute --

In Column 8, Line 45, please change "value: is related to the subsequent attribute name;" to -- value is related to the subsequent attribute name; --

In Column 8, Line 47, please change "one-attribute heading already existing in the database;" to -- one attribute heading already existing in the database; --

In Column 8, Line 49, plese change "at least one attribute heading already existing adding" to -- at least one attribute heading already existing, adding --

In Column 8, Line 58, please change "attribute: heading already existing in the database;" to -- attribute heading already existing in the database; --

UNITED STATES PATENT AND TRADEMARK OFFICE
CERTIFICATE OF CORRECTION

PATENT NO. : 6,976,036 B2
APPLICATION NO. : 09/957570
DATED : December 13, 2005
INVENTOR(S) : Yun-Tung Lau, Richard Chipman, Peter Poon, and Kiran Kuchipudi It is certified that error appears in the above-identified patent and that said Letters Patent is hereby corrected as shown below:

IN THE CLAIMS CONT'D.-

In Column 8, Line 64, please change "of tile at least one attribute heading, creating a new" to -- of the at least one attribute heading, creating a new --

In Column 9, Line 6, please change "dividing incoming-attribute data into a class element" to -- dividing incoming attribute data into a class element --

In Column 10, Line 4, please change "the at least one attribute heading already existing; in the" to -- the at least one attribute heading already existing in the --

In Column 10, Line 13, please change

"heading; and if the subsequent attribute name is not" to

-- heading; and if the subsequent attribute name is not -- (New Paragraph)

In column 10, Line 18, please change "attributes names are obtained then creating a new" to -- attribute names are obtained then creating a new --

In Column 10, Line 22, please change "subsequent attribute name or holding collected data in" to -- subsequent attribute name, or holding collected data in --

Signed and Sealed this

Eighth Day of August, 2006

JON W. DUDAS
*Director of the United States Patent and Trademark Office*